United States Patent
Morimoto et al.

(10) Patent No.: US 11,353,377 B2
(45) Date of Patent: Jun. 7, 2022

(54) WEDGE LOOSENESS INSPECTION DEVICE OF ROTARY ELECTRIC MACHINE

(71) Applicant: Mitsubishi Electric Corporation, Tokyo (JP)

(72) Inventors: Yoshihiro Morimoto, Tokyo (JP); Daisuke Mizuno, Tokyo (JP); Kazuhiko Fukushima, Tokyo (JP); Kohei Nakamura, Tokyo (JP); Wataru Nagaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 101 days.

(21) Appl. No.: 16/477,566

(22) PCT Filed: Jan. 23, 2017

(86) PCT No.: PCT/JP2017/002088
§ 371 (c)(1),
(2) Date: Jul. 12, 2019

(87) PCT Pub. No.: WO2018/134992
PCT Pub. Date: Jul. 26, 2018

(65) Prior Publication Data
US 2019/0368968 A1 Dec. 5, 2019

(51) Int. Cl.
*G01M 13/00* (2019.01)
*G01M 7/08* (2006.01)
*G01N 29/04* (2006.01)

(52) U.S. Cl.
CPC .............. *G01M 13/00* (2013.01); *G01M 7/08* (2013.01); *G01N 29/045* (2013.01); *G01N 2291/2693* (2013.01)

(58) Field of Classification Search
CPC ...... G01M 13/00; G01M 7/08; G01N 29/045; G01N 2291/2693
USPC .......................................................... 73/643
See application file for complete search history.

(56) References Cited

U.S. PATENT DOCUMENTS 4,889,000 A * 12/1989 Jaafar .................... G01R 31/34
73/865.8
4,962,660 A 10/1990 Dailey et al.
(Continued)

FOREIGN PATENT DOCUMENTS

CN 107421730 A * 12/2017
EP 0684483 A2 * 11/1995 ............ G01M 15/00
(Continued)

OTHER PUBLICATIONS

Office Action dated Jul. 10, 2020, issued in corresponding Chinese Patent Application No. 201780083454.1, 13 pages including 6 pages of English translation.
(Continued)

*Primary Examiner* — Lisa M Caputo
*Assistant Examiner* — Rose M Miller
(74) *Attorney, Agent, or Firm* — Buchanan Ingersoll & Rooney PC

(57) ABSTRACT

In a wedge looseness diagnosis which is performed by striking wedges of a rotary electric machine, a variation of a wave form of a strike sound is reduced with respect to a variation of an amount of looseness of the wedges, and it is difficult that a slight difference of the amount of the looseness of the wedges is discriminated, so that the wedges are struck by a strike portion in a state where the wedges are pressed by a pressure portion which presses the wedges, and a strike sound at a high frequency is reduced, whereby an amount of a variation of magnitude of the strike sound is enlarged with respect to a valuation of the amount of the looseness of the wedges, and the amount of the looseness of the wedges is judged in accordance with the strike sound which is obtained by a strike sound measuring portion.

12 Claims, 14 Drawing Sheets

(56) References Cited

U.S. PATENT DOCUMENTS

2014/0020470 A1     1/2014    Tsutsui et al.
2014/0260526 A1     9/2014    Tsutsui et al.

FOREIGN PATENT DOCUMENTS

| | | |
|---|---|---|
| JP | 2000131196 A | 5/2000 |
| JP | 2013142598 A | 7/2013 |
| JP | 2014-178220 A | 9/2014 |
| KR | 100152440 B1 | 12/1988 |

OTHER PUBLICATIONS

Extended European Search Report dated Jan. 3, 2020 for corresponding European partent application No. 17893207.5, 7 pages.
Office Action dated Sep. 14, 2020, issued in the corresponding Korean Patent Application No. 1020197020351, 11 pages including 6 pages of English translation.
International Search Report (with English translation) and Written Opinion issued in corresponding International Patent Application No. PCT/JP2017/002088, 9 pages (dated Apr. 4, 2017).
Office Action dated Oct. 28, 2020, issued in Canadian Patent Application No. 3,050,067, 6 pages.
Office Action/Examination Search Report dated Apr. 8, 2021, by the Canadian Patent Office in corresponding Canadian Patent Application No. 3,050,067. (5 pages).
Office Action dated Dec. 23, 2021, issued in the corresponding Canadian Patent Application No. 3,050,067, 5 pages.

* cited by examiner

WEDGE LOOSENESS INSPECTION DEVICE OF ROTARY ELECTRIC MACHINE

TECHNICAL FIELD

The present invention relates to a wedge looseness inspection device of a rotary electric machine.

BACKGROUND ART

A rotary electric machine is composed of a rotor and a stator, and a variation of a magnetic field, which is caused in accordance with a rotation of the rotor, is converted to electric energy by using the stator. The stator has a configuration in which a coil is inserted to a slot of a core in which silicon steel plates are laminated, and the coil is pressed and fixed by using a component having an insulation capability. As a method for pressing and fixing the coil, the stator has a configuration in which a ripple spring having a wave shape and a wedge, which is formed as a component having a plate shape, are overlaid at an upper position of the coil, and the coil is pressed by the wedge while the ripple spring is pressed and constricted, whereby a coil conductor is fixed. In a generator which has the above-described configuration, it is required that the coil is maintained and administered in a predefined pressure fixing state. In the generator which has the above-described coil fixing configuration, a fixing state of the wedge is inspected after predefined usage years and months elapse, and if looseness is caused, the ripple spring or the wedge is replaced and maintained in order to recover a pressure force.

When an inspection of looseness of a wedge of the rotary electric machine is performed, a wedge is struck by a hammer, and it is performed that the looseness of the wedge is judged in accordance with a sound which is caused by striking the wedge (refer to Patent Document 1).

Moreover, in order to prevent that an inspection of looseness of a wedge depends on a skill of an inspector, a device (refer to Patent Document 2), by which a strike force is controlled, and a strike is applied to a plurality of positions at a surface of a wedge so as to cause a plurality of strike sounds, and an amount of a characteristic is obtained in accordance with the plurality of strike sounds, and a looseness state is judged, is suggested.

CONVENTIONAL ART DOCUMENT

Patent Document

Patent Document 1: Japanese Laid-Open Patent Publication No. 2000-131196
Patent Document 2: Japanese Laid-Open Patent Publication No. 2013-142598

SUMMARY OF THE INVENTION

Problems to be Solved by the Invention

Looseness of a wedge of a rotary electric machine is struck by a hammer, and a strike sound, which is caused when the looseness of the wedge of the rotary electric machine is struck, is measured, and a state, in which the wedge is fastened, is discriminated from a state, in which the wedge is loosened, in accordance with magnitude of a wave form of the strike sound. However, if an amount of the looseness of the wedge is more or less varied, and when the wave form of the strike sound is not greatly varied, there has been a problem in that it is difficult that a slight looseness state of the wedge is hold.

The present invention has been made to solve the above-described problems, and an object of the invention is to obtain a wedge looseness inspection device in which a valuation of a strike sound, which is caused, is enlarged with respect to a valuation of an amount of looseness of wedges, and a slight variation of the amount of the looseness of the wedges can be judged, whereby accuracy of a judgement is improved.

Devices for Solving Problems

A wedge looseness inspection device, of a rotary electric machine according to the present invention, includes a strike portion which strikes wedges of the rotary electric machine; a pressure portion which presses surfaces of the wedges; a strike sound measuring portion which obtains a strike sound which is caused when the wedges are struck; a base portion on which the strike portion, the pressure portion, and strike sound measuring portion are mounted; and a control device which controls the strike portion, the pressure portion, and strike sound measuring portion; wherein the wedges are struck by the strike portion, in a state where the wedges are pressed by the pressure portion, and an amount of looseness of the wedges is judged in accordance with the strike sound which is obtained by the strike sound measuring portion.

Effects of the Invention

According to the wedge looseness inspection device of the rotary electric machine of the present invention, a strike sound is obtained in a state where surfaces of wedges are pressed by a pressure portion, whereby a strike sound, which is caused in a state in which the wedges are tightly fixed, is suppressed, and an amount of a variation of magnitude of the strike sound can be enlarged with respect to a variation of an amount of looseness of the wedges, whereby the wedge looseness inspection device, in which accuracy of a judgment for the amount of the looseness of the wedges is high, can be realized.

MODE FOR CARRYING OUT THE INVENTION

Embodiment 1

Figure 1:
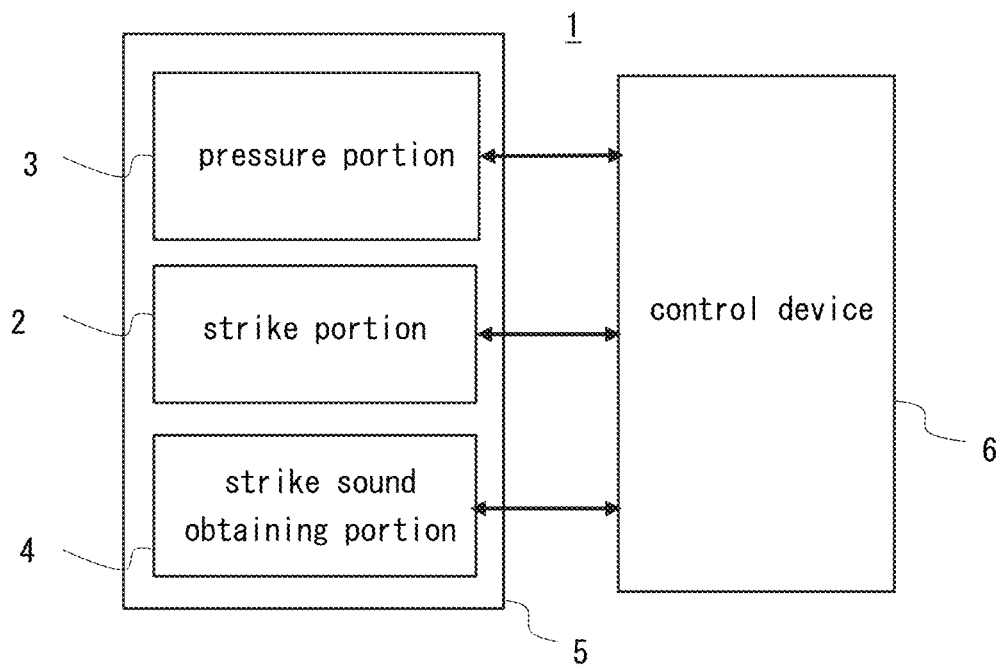
FIG. 1 is a configuration diagram which indicates a wedge looseness inspection device of a rotary electric machine according to Embodiment 1 of the present invention.

FIG. 1 is a diagram which indicates a configuration of a wedge looseness inspection device of a rotary electric machine of the present invention, and a wedge looseness inspection device 1 includes a strike portion 2 which strikes wedges of the rotary electric machine; a pressure portion 3 which presses surfaces of the wedges; a strike sound measuring portion 4 which obtains a strike sound which is caused when the wedges are struck; a base portion 5 on which the strike portion 2, the pressure portion 3, and the strike sound measuring portion 4 are mounted; and a control device 6 which controls the strike portion 2, the pressure portion 3, and the strike sound measuring portion 4; in which the wedges are struck by the strike portion 2, in a state where the wedges are pressed by the pressure portion 3, and an amount of looseness of the wedges is judged in accordance with the strike sound which is obtained by the strike sound measuring portion 4.

Figure 2:
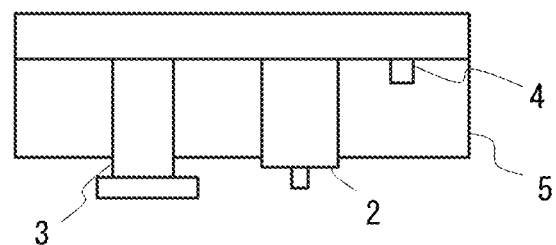
FIG. 2 is a schematic configuration diagram which indicates a part of the wedge looseness inspection device of the rotary electric machine of the present invention.

An arrangement, which is viewed from a side surface of the wedge looseness inspection device 1 of the rotary electric machine, is configured as indicated in FIG. 2. In other words, the strike portion 2, the pressure portion 3, and the strike sound measuring portion 4 are attached to the base portion 5, and the control device 6 is arranged, by using an electrical wiring, at a position which is different form a position at which the base portion 5 is arranged. The pressure portion 3 is protruded from the base portion 5 so as to be arranged in such a way that the pressure portion 3 is easily contacted to the wedges.

Figure 3:
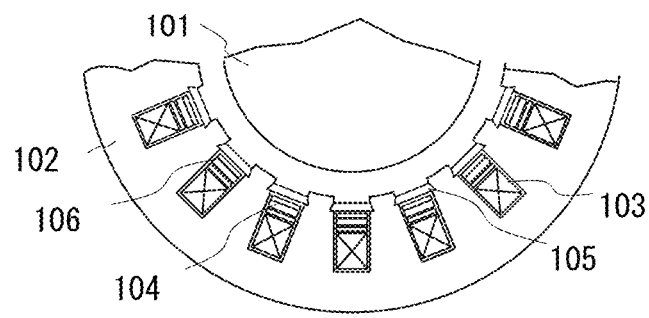
FIG. 3 is a configuration diagram which indicates a configuration of a stator of the rotary electric machine which is an inspection object of the wedge looseness inspection device of the rotary electric machine of the present invention.
Figure 4:
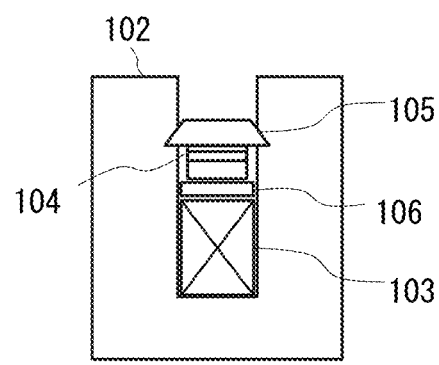
FIG. 4 is an enlarged diagram which indicates a part of the stator of the rotary electric machine.
Figure 5:
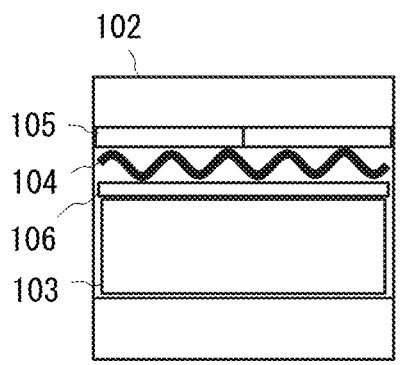
FIG. 5 is a schematic cross-sectional diagram which indicates the part of the stator of the rotary electric machine in FIG. 4.

A stator of the rotary electric machine, which is an inspection object of the wedge looseness inspection device 1, is configured as indicated in a part diagram in FIG. 3. In other words, the rotary electric machine is composed of a rotor 101 which is rotated, and a stator 102 which is not moved with respect to the rotor 101. Grooves, which are spaced at regular intervals, are arranged in a circumference direction at the stator 102, and coils 103 are restrained and maintained, via ripple springs 104, in such a way that the coils 103 are pressed to the stator 102 by using wedges 105 which are inserted to opened portions of the grooves of the stator 102. An amount of looseness of the ripple springs 104 is regulated by using shims 106. When one of the grooves, which are indicated in FIG. 3, is enlarged and indicated, the groove is represented as FIG. 4. Moreover, a cross section of a part of the groove, which is indicated in FIG. 4, is configured as indicated in FIG. 5.

When a restraint force of the coils 103 is lowered, the coils 103 are vibrated in accordance with an electromagnetic force of the coils 103, a mechanical vibration of an instrument or the like, and insulating layers of the coils 103 are worn, whereby an insulation breakdown is caused, and the stator 102 and the coils 103 are short-circuited, whereby a cause of a stop operation, damage, or an accident of a rotary electric machine is generated. In order to previously prevent this problem, in a rotary electric machine which has a coil fixing configuration, a fixing state of the coils 103 is periodically inspected in accordance with a looseness state of the wedges 105, and when looseness is caused, the wedges 105 and the ripple springs 104 are replaced, whereby the restraint force of the coils 103 is maintained.

A case, in which maintenance inspection work of a looseness inspection of the wedges 105 will be performed by using the wedge looseness inspection device 1 according to Embodiment 1, will be explained.

Firstly, the rotor 101 of the rotary electric machine is detached, and the wedge looseness inspection device 1 is set on the wedges 105, which are inspected, in such a way that the wedges 105 at the opened portions of the grooves of the stator 102 are easily inspected, and the wedge looseness inspection device 1 is fixed by using the base portion 5 in such a way that the wedge looseness inspection device 1 is not shifted. At this time, the strike portion 2 and the pressure portion 3 are arranged on an identical wedge 105. After that, the pressure portion 3 is contacted to a surface of the wedge 105, and the wedge 105 is pressed. In this state, an electric current is instantaneously supplied to the strike portion 2 by using the control device 6 of the wedge looseness inspection device 1, whereby the strike portion 2 instantaneously strikes the wedge 105. A strike sound, which is caused by striking the wedge 105, is measured by using the strike sound measuring portion 4, and an amount of the looseness of the wedge 105 is judged by using a computing process which is performed by the control device 6.

Figure 6:
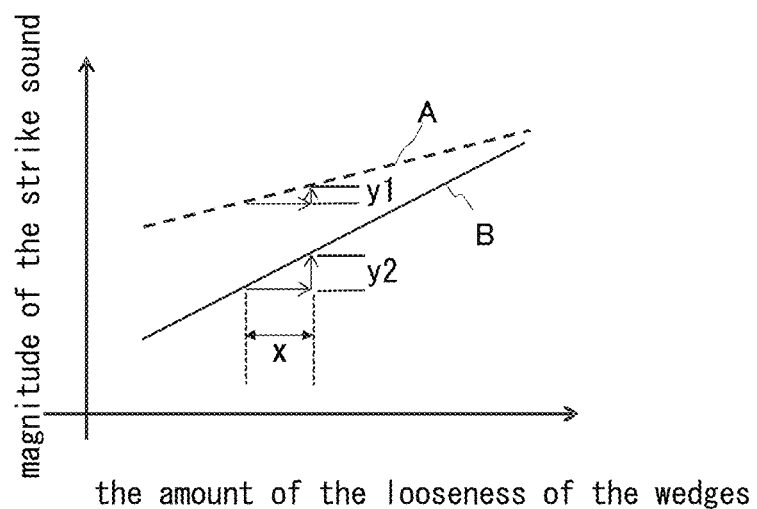
FIG. 6 is a characteristic chart which indicates an effect which is obtained by the wedge looseness inspection device of the rotary electric machine of the present invention.

A relation of magnitude of the strike sound, which is obtained, with respect to a variation of the amount of the looseness of the wedges 105 is indicated in FIG. 6. FIG. 6 is a characteristic chart which indicates the relation between the amount of the looseness of the wedges 105 and the magnitude of the strike sound, and the amount of the looseness of the wedges 105 is represented along a horizontal axis, and the magnitude of the strike sound is represented along a vertical axis. A dashed line "A", which is indicated in the characteristic chart, represents the relation between the amount of the looseness of the wedges 105 and the magnitude of the strike sound, in a state where the surfaces of the wedges 105 are not pressed, and a solid line "B" represents the relation between the amount of the looseness of the wedges 105 and the magnitude of the strike sound, in a state where the surfaces of the wedges 105 are pressed. In a configuration of the rotary electric machine which is an object of the present invention, the strike sound is enlarged in accordance with an increment of the amount of the looseness of the wedges 105. Moreover at the same time, although a main ingredient of a frequency of the strike sound is not represented in the characteristic chart, an ingredient of a low frequency in the main ingredient of the frequency of the strike sound is gradually increased in accordance with an increment of the amount of the looseness of the wedges 105.

According to this Embodiment 1, the surfaces of the wedges 105 are pressed by the pressure portion 3, whereby a sound at a high frequency, which is caused when the wedges 105 are tightly fixed, is inhibited.

In other words, a strike sound at a high frequency is reduced, whereby an inclination of a characteristic is increased, as indicated in the solid line "B", in comparison with an inclination of a characteristic indicated in the dashed line "A", and an amount of a variation of the magnitude of the strike sound is enlarged from "y1" to "y2" with respect to a variation of an amount "x" of the looseness of the wedges 105.

Thereby, an inhibition result of a different vibration, which depends on a frequency, is realized, so that a sound, which is caused when the wedges 105 are tightened, can be more greatly inhibited, as indicated in FIG. 6, in comparison with a case in which the pressure portion 3 is not provided. Thereby, the amount of the looseness of the wedges 105 can be more easily discriminated, and a judgment resolution can be enhanced.

Figure 7:
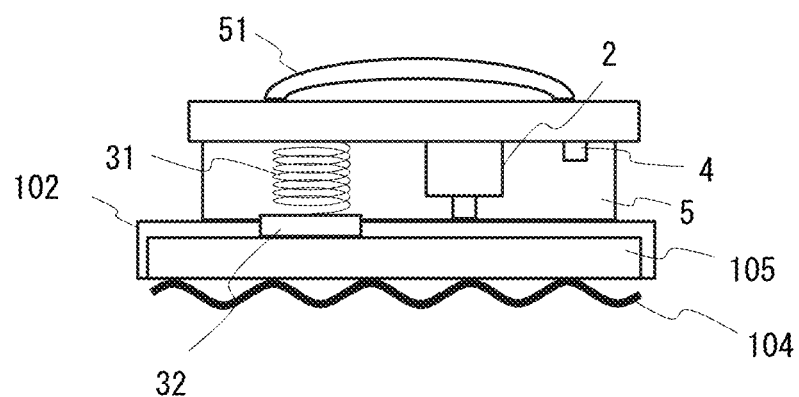
FIG. 7 is a configuration diagram which indicates a usage state of the wedge looseness inspection device of the rotary electric machine of the present invention.

The wedge looseness inspection device 1, of the rotary electric machine according to Embodiment 1 of the present invention, includes the strike portion 2 which includes a mechanism for supplying strike energy by which the wedges 105 are vibrated; the pressure portion 3 by which the surfaces of the wedges 105 are pressed; the strike sound measuring portion 4 by which the strike sound is obtained; the base portion 5 on which the strike portion 2, the pressure portion 3, and the strike sound measuring portion 4 are mounted; and the control device 6. The base portion 5 is fixed on the surface of the stator 102, as indicated in FIG. 7, and the pressure portion 3 is arranged in such a way that the pressure portion 3 is contacted to the surfaces of the wedges 105. In the wedge looseness inspection device 1, in order to easily perform a handling work, handling portions 51 are provided on an upper surface of the base portion 5. In order to carry and align the wedge looseness inspection device 1 by a worker, the handling portions 51 are used.

As indicated in FIG. 7, the pressure portion 3 is composed of an elastic body 31 and a pressure component 32. Although it is suitable that the elastic body 31 is formed as a component which has a predefined stiffness, it is more desirable, in order to perform a looseness judgement with a higher accuracy, that the elastic body 31 is formed as a component, such as a spring, which has a characteristic being similar to a characteristic of a linear elastic body. Moreover, although it is suitable that the pressure component 32 is formed as a component which has a predefined mass, it is desirable and advantageous that the pressure component 32 is formed as a hard object, such as a metal component, which is strong with respect to a deformation. As a reason for the above-described explanation, it is required that an influence of an elasticity coefficient of the pressure component 32 is reduced when the elastic body 31 and the pressure component 32 are selected, and the reason is advantageous for realizing the wedge looseness inspection device 1 having a high accuracy. In this case, it is required that the wedge looseness inspection device 1 does not separated from the stator 102 and the wedges 105, so that it is required that a pressure force, which is caused by the pressure portion 3, is reduced with respect to a fixing force of the base portion 5. Moreover, when the elastic body 31 has a natural length, the pressure component 32 is protruded, over the base portion 5, from the base portion 5 to a direction of the wedges 105, in such a way that the wedges 105 are pressed by the pressure component 32 when the wedge looseness inspection device 1 is attached.

In addition, when a combination of the predefined stiffness of the elastic body 31 and the predefined mass of the pressure component 32 is performed, it is desirable that the predefined stiffness of the elastic body 31 and the predefined mass of the pressure component 32 are selected in such a way that the following formula is satisfied with respect to a vibration frequency "ω" of the wedges 105, which is caused when the wedges 105 are vibrated.

$$\sqrt{(k/m)} < \omega \qquad \text{[Number 1]}$$

In this case, a wedge looseness judgment, which has a higher accuracy, can be realized. It is suitable for a vibration frequency "ω" which is caused when the wedges 105 are vibrated that a frequency, which is obtained when the wedges 105 and the ripple springs 104, which have an equivalent material and a size, are previously used, and a looseness state is recreated in a rotary electric machine, an simulation device of a stator of a rotary electric machine or the like, and the wedges 105 are vibrated, is used as the vibration frequency "ω".

A data set, which is corresponding to various rotary electric machines, is held by using this method, whereby a wedge looseness judgment, which has a high accuracy, can be realized. In addition, in an easy method, it is suitable that the wedges 105 are vibrated in a state where the pressure component 32 is not contacted to the wedges 105, and a frequency, which has a margin at a low frequency side, is used as a vibration frequency "ω" in accordance with a vibration frequency which is obtained when the wedges 105 are vibrated.

Figure 8:
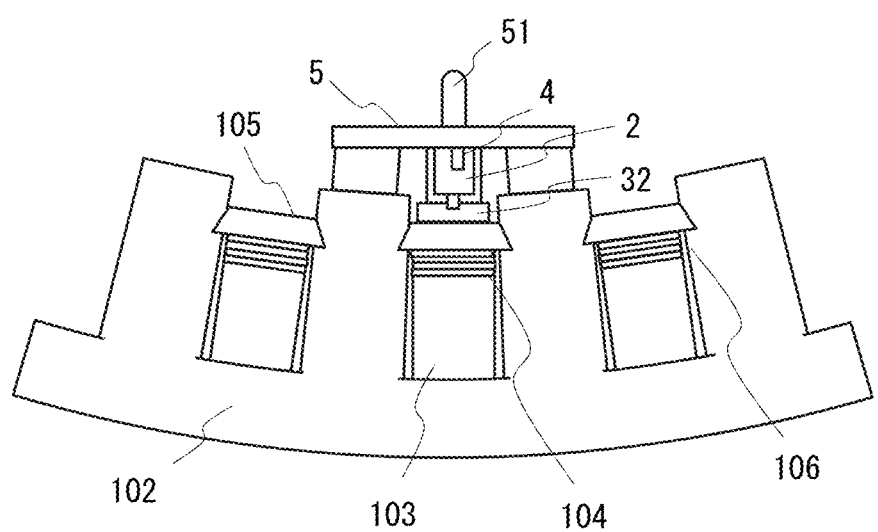
FIG. 8 is a configuration diagram which indicates a usage state of the wedge looseness inspection device of the rotary electric machine of the present invention.

In FIG. 7, a cross section configuration, which is viewed from a side surface side of the wedge looseness inspection device 1, is indicated. A configuration, in which the wedge looseness inspection device 1 is viewed from a rotation axis side of the stator 102 of the rotary electric machine, is indicated in FIG. 8. As indicated in FIG. 8, the coils 103 and the ripple springs 104 are provided in the grooves which are provided at the stator 102, and the coils 103 and the ripple springs 104 are pressed by using the wedges 105. In order to recognize that looseness is not caused for a pressure operation of the wedges 105, the wedge looseness inspection device 1 is fixed on an inner surface of the stator 102 so as to perform an inspection. The wedge looseness inspection device 1 is fixed to the stator 102 by using the base portion 5. In FIG. 8, although the pressure portion 3 is hidden behind the strike portion 2, the pressure portion 3, the strike portion 2, and the strike sound measuring portion 4 are sequentially arranged as indicated in FIG. 2 and FIG. 7. As indicated in FIG. 8, the wedge looseness inspection device 1 is fixed so as to perform an inspection in a state where the wedges 105 are stridden by the wedge looseness inspection device 1.

Figure 9:
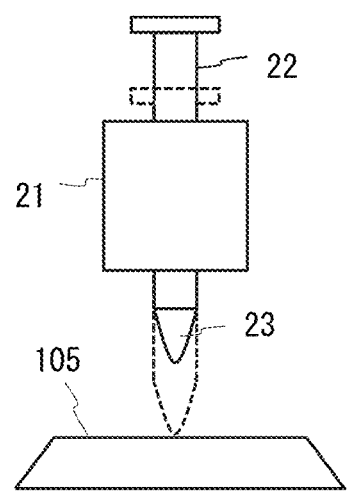
FIG. 9 is a configuration diagram which indicates a strike portion of the wedge looseness inspection device of the rotary electric machine of the present invention.

FIG. 9 is a configuration diagram which indicates the strike portion 2 which is used in the wedge looseness inspection device 1 according to Embodiment 1 of the present invention. The strike portion 2 is composed of a solenoid actuator 21, a shaft 22, and a strike element 23 which are contained in a linearly operating type. When an electric current is not supplied, although the shaft 22 is stayed at a position which is indicated by using a solid line in FIG. 9, an electric current is supplied to the solenoid actuator 21, whereby the shaft 22 and the strike element 23, which is attached to a tip of the shaft 22, are linearly shifted to a position which is indicated by using a dashed line, and the wedges 105 are struck from the base portion 5.

The strike sound measuring portion 4 uses a sound collection sensor, for example, such as a MEMS microphone or a capacitance microphone. Moreover, it is suitable that the strike sound measuring portion 4 is arranged at any position of the base portion 5, when a strike sound can be correctly measured at the position. Moreover, it is suitable that a sound collection sensor holding portion is newly attached, for example, to the base portion 5, and a sound collection sensor is provided at the sound collection sensor holding portion.

At the base portion 5, a fixing function, for example, such as a magnet or an air inhalation device, is provided. By using the fixing function, the base portion 5 is fixed at the stator 102 of the rotary electric machine, and it is prevented that the wedge looseness inspection device 1 is pulled and stripped from the stator 102 when the wedges 105 are struck, and a strike condition is always maintained at a constant condition, whereby a wedge looseness judgment can be correctly performed.

In addition, in the Embodiment 1, although a configuration of the strike portion 2, in which the shaft 22 and the solenoid actuator 21 are combined, is indicated, a configuration, in which a force is stocked, for example, in an elastic body, and the force is instantaneously released, whereby a strike operation is realized, can be also used. Moreover, when a configuration, in which the strike element 23 can strike the wedges 105, is realized, the other configuration can be applied as a matter of course, and a rotational mechanism, such as a seesaw, which is not a mechanism which is linearly operated as indicated in Embodiment 1, can be also used.

Figure 10:
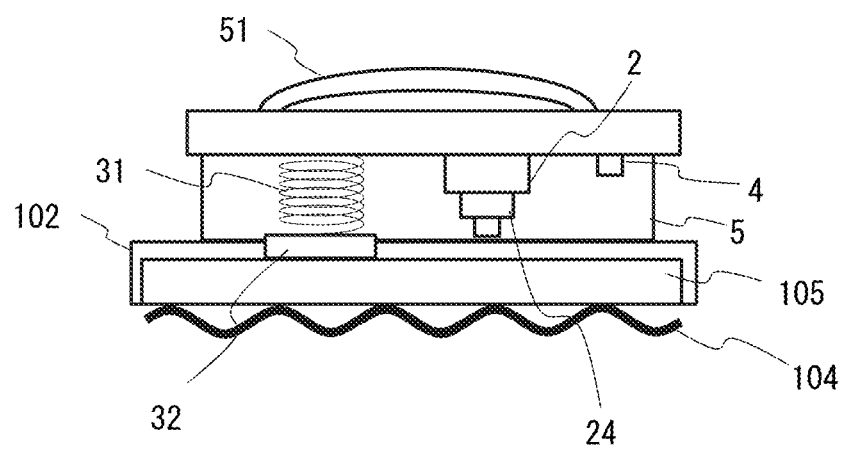
FIG. 10 is a configuration diagram which indicates the strike portion of the wedge looseness inspection device of the rotary electric machine of the present invention.

FIG. 10 indicates a configuration in which the strike portion 2 according to Embodiment 1 is partly improved. In other words, FIG. 10 indicates a configuration in which a strike force measuring devices 24 is provided at the strike portion 2. An acceleration state, which is caused by the solenoid actuator 21, can be controlled by using the control device 6, in such a way that the strike force measuring devices 24 is provided, and a strike force is measured, and the strike force is maintained at a constant state. The strike portion 2 is configured as described above, whereby a constant strike force is realized in such a way that a wedge strike condition, in which heights of the surfaces of the wedges 105 are different or a strike position is deviated, and a variation of a wedge strike force with respect to a variation of an environment are considered, and a judgment accuracy of a wedge looseness judgment can be enhanced.

Figure 11:
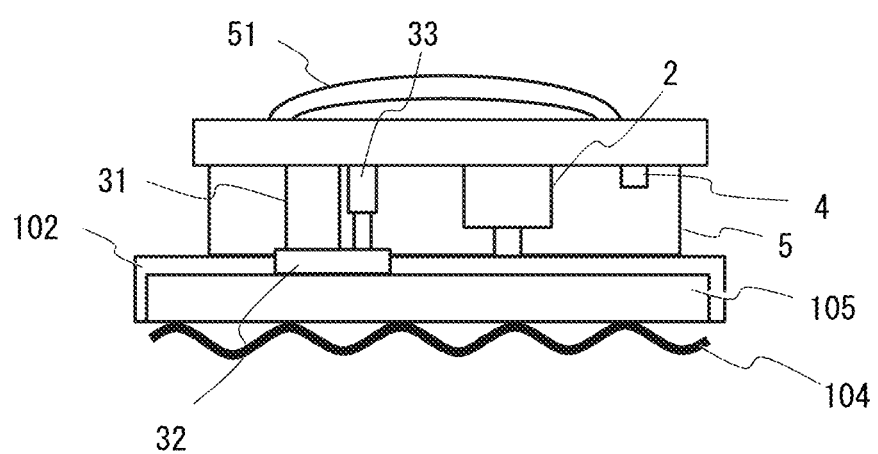
FIG. 11 is a configuration diagram which indicates a deformation example of a pressure portion of the wedge looseness inspection device of the rotary electric machine of the present invention.

FIG. 11 indicates a case in which the pressure portion 3 according to Embodiment 1 is composed of the elastic body 31, the pressure component 32, and an attenuator 33. In this case, a design flexibility of a vibration characteristic, which is included in the pressure portion 3, is expanded in comparison with a pressure portion in which the attenuator 33 is not included. The attenuator 33 quickly attenuates a vibration which is caused from the wedges 105, and the vibration can be regulated in such a way that a variation of magnitude of a strike sound with respect to an amount of the looseness of the wedges 105 can be more easily discriminated in accordance with the rotary electric machine. Thereby, a judgment resolution of a wedge looseness judgment can be more enhanced.

Figure 12:
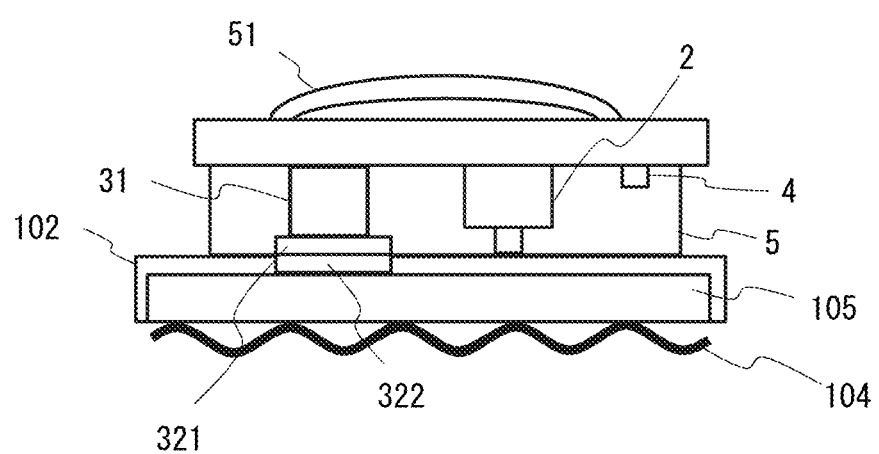
FIG. 12 is a configuration diagram which indicates a deformation example of a pressure portion of the wedge looseness inspection device of the rotary electric machine of the present invention.

FIG. 12 indicates a case in which the pressure component 32 of the pressure portion 3 according to Embodiment 1 is composed of a plurality of pressure components. In other words, the pressure component 32 is composed of a first pressure component 321 and a second pressure component 322, and the second pressure component 322, which is positioned at a side portion which is contacted to the wedges 105, is made of a material, such as an elastomer, which has an elastic capability. In addition, a configuration except for a configuration of the first pressure component 321 and the second pressure component 322 is identical to a configuration in the above-described explanation.

In general wedges 105, there is a case in which a laminated resin material is used in accordance with a generator, and in the case, when a metallic pressure component is used and a pressure force is applied to the surfaces of the general wedges 105, there is a possibility in which a flaw is caused at the surfaces of the general wedges 105. In other words, in an identical rotary electric machine, depths from the stator 102 to the surfaces of the wedges 105 are varied, and in particular, when a depth to the surfaces of the wedges 105 is short, the elastic body 31 is greatly constricted, and the pressure component 32 is more strongly pressed, so that a flaw is easily caused at the wedges 105. Therefore, a contact component, which is used as the second pressure component 322, with respect to the wedges 105 is composed of a material, such as an elastomer, which has an elastic capability, whereby it can be prevented that a flaw is caused at the surfaces of the wedges 105.

Figure 13:
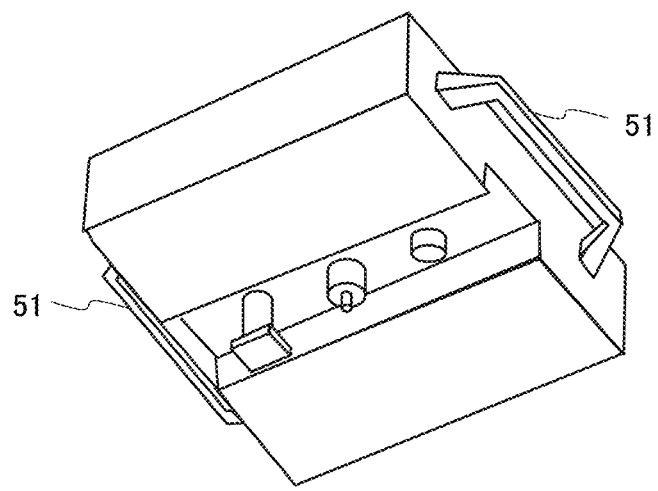
FIG. 13 is a configuration diagram which indicates a deformation example of handling portions of the wedge looseness inspection device of the rotary electric machine of the present invention.

FIG. 13 indicates a configuration in which the attachment positions of the handling portions 51 according to Embodiment 1 are varied. In Embodiment 1, as indicated in FIG. 7, although the handling portions 51 are provided at the upper portion of the wedge looseness inspection device 1, handling portions 51, in a configuration which is indicated in FIG. 13, are provided at side surfaces of the wedge looseness inspection device 1. In addition, a configuration except for a configuration of the handling portions 51 is identical to a configuration in the above-described explanation.

In the wedge looseness inspection device 1 according to Embodiment 1, when a worker advances an inspection work, it is explained that the rotor 101 is detached from the rotary electric machine. However, when a gap between the rotor 101 and the stator 102 has a size for which the wedge looseness inspection device 1 is inserted to the gap, the wedge looseness inspection device 1, which includes the handling portions 51, is configured as thin as possible, whereby a peculiar effect, in which an input-output operation and a fixing operation can be performed, can be obtained in a state where the rotor 101 is not detached.

Embodiment 2

In the wedge looseness inspection device 1 according to Embodiment 1, although it is estimated that a worker performs an inspection by directly handling the wedge looseness inspection device 1, great care is required for a work in which a rotor 101 of a rotary electric machine is pulled out from a stator 102, so that a case, in which a wedge looseness inspection device 1 is configured in such a way that a wedge looseness inspection is performed in a state where the rotor 101 is not pulled out, will be explained as a case according to Embodiment 2.

Figure 14:
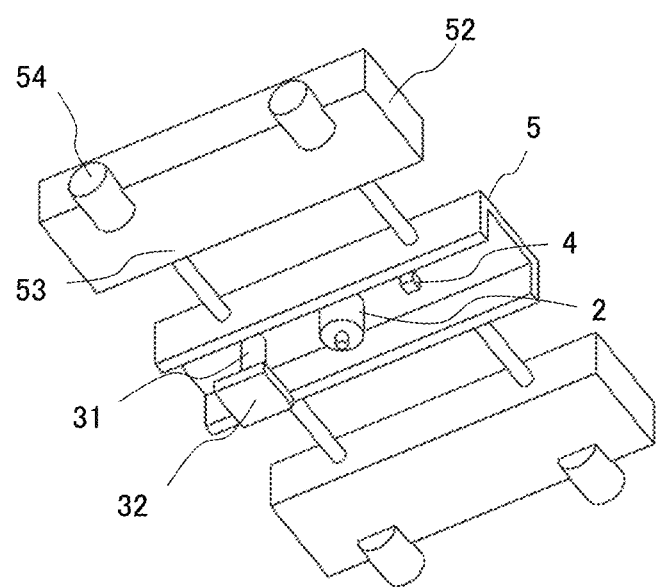
FIG. 14 is a configuration diagram which indicates a wedge looseness inspection device of a rotary electric machine according to Embodiment 2 of the present invention.

In Embodiment 2, a wedge looseness inspection device 1 of the rotary electric machine, by which wedges 105 of the rotary electric machine can be inspected in a state where the rotor 101 is not pulled out, will be explained. FIG. 14 is a configuration diagram which indicates the wedge looseness inspection device 1 according to Embodiment 2. A configuration of a base portion 5 of the wedge looseness inspection device 1, which is indicated in Embodiment 2, is different with respect to a configuration of the base portion 5 which is indicated in Embodiment 1. In other words, in the configuration according to Embodiment 2, the wedge looseness inspection device 1 has a configuration in which an inspection work can be performed by using the wedge looseness inspection device 1 alone while the wedge looseness inspection device 1 is shifted along the wedges 105 which are extended in an axis direction of the stator 102 of the rotary electric machine so as to be arranged. In addition, each of the same symbols in a configuration, which is explained in Embodiment 1, respectively indicates the same or equivalent part.

Figure 15:
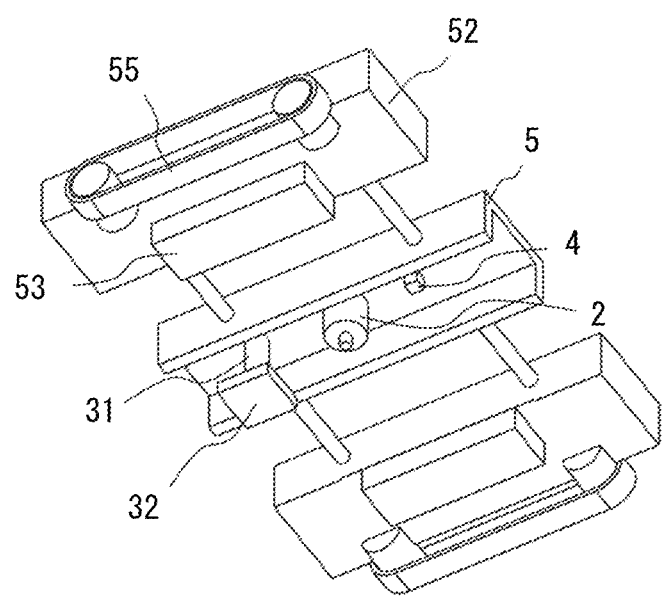
FIG. 15 is a configuration diagram which indicates a deformation example of the wedge looseness inspection device of the rotary electric machine according to Embodiment 2 of the present invention.

In FIG. 14, the base portion 5 includes travelling devices 52 by which a scanning operation is performed on the stator 102 in an axis direction of the rotary electric machine, and suction devices 53 by which the wedge looseness inspection device 1 is sucked to the stator 102. At the travelling devices 52, wheels 54 are used or crawlers 55 are used as indicated in FIG. 15. The suction devices 53, which are indicated in FIG. 14 and FIG. 15, are composed, for example, of magnets or air inhalation devices. The wedge looseness inspection device 1 is traveled in the rotary electric machine by using the travelling devices 52 while the wedge looseness inspection device 1 is sucked to the stator 102 by using suction devices 53, whereby a wedge looseness inspection at any position can be realized. In the wedge looseness inspection device 1 according to Embodiment 2, an inspection operation, in which the wedge looseness inspection device 1 is inserted to a gap between the rotor 101 and the stator 102 of the rotary electric machine, can be performed, whereby a pulling-out process, a reinsertion process, and a regulation process of the rotor 101 of the rotary electric machine can be avoided, so that an effect, in which a construction period for an inspection can be greatly reduced, can be obtained.

Figure 16:
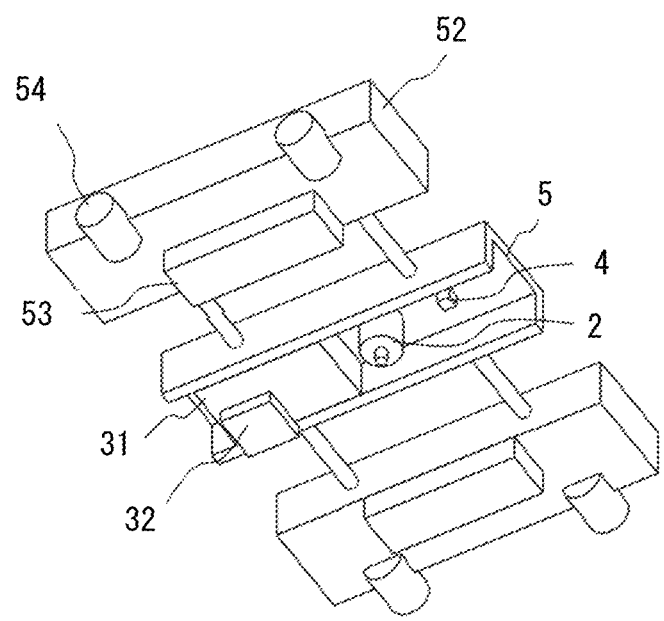
FIG. 16 is a configuration diagram which indicates a deformation example of a pressure portion of the wedge looseness inspection device of the rotary electric machine of the present invention.
Figure 17:
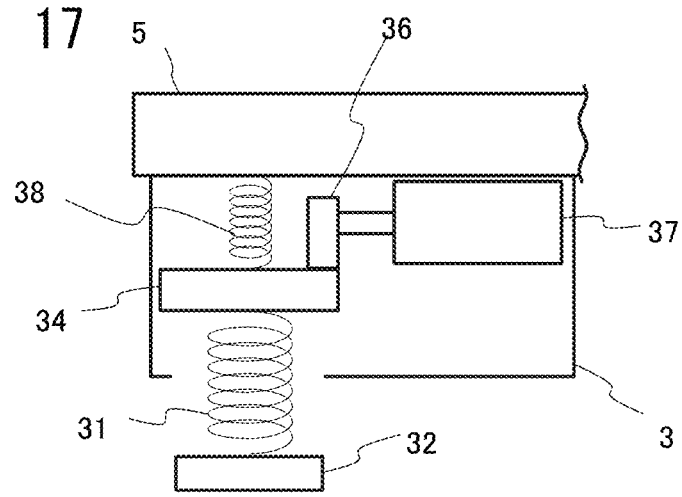
FIG. 17 is an operation diagram which indicates the pressure portion of the wedge looseness inspection device of the rotary electric machine of the present invention.
Figure 18:
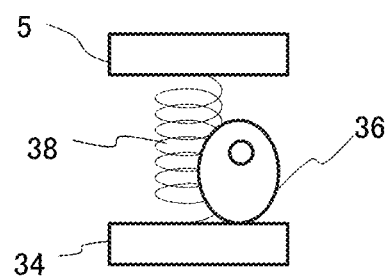
FIG. 18 is an operation diagram which indicates the pressure portion of the wedge looseness inspection device of the rotary electric machine of the present invention.
Figure 19:
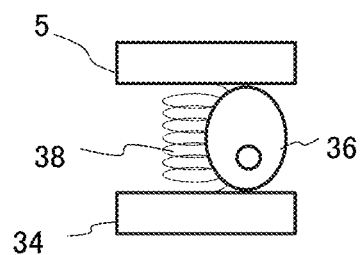
FIG. 19 is an operation diagram which indicates the pressure portion of the wedge looseness inspection device of the rotary electric machine of the present invention.

FIG. 16 is related to an improvement of a configuration of a pressure portion 3, and the pressure portion 3 is formed in such a way that a function, by which a height of a pressure component 32 of the pressure portion 3 is freely regulated, is included. One example of a configuration of the pressure portion 3 is indicated in FIG. 17. As indicated in FIG. 17, the pressure portion 3 includes an elastic body 31, the pressure component 32, a back plate 34, and a back plate driving device 35. The back plate 34 has a configuration in which the back plate 34 can be linearly moved in a pressure direction of the pressure portion 3, and the back plate 34 is configured in such a way that a position of the back plate 34 can be varied by using the back plate driving device 35. The back plate driving device 35 is composed of a cam 36, a motor 37, and a back plate return spring 38, and when the cam 36 is rotated by using the motor 37, the back plate 34 is shifted in a pressure direction of the pressure portion 3, as indicated in FIG. 18, in accordance with a variation of a diameter of the cam 36. Thereby, when an inspection is performed, the back plate 34 is shifted in a direction of the wedges 105, whereby the pressure component 32 is pressed to the wedges 105. Moreover, when the travelling devices 52 are traveled, the back plate 34 is shifted in a direction of the base portion 5 as indicated in FIG. 19, whereby the back plate return spring 38 can pull the back plate 34, and the pressure component 32 can be separated from the wedges 105.

Therefore, a resistance, which is caused, in accordance with contact friction between the pressure component 32 and the wedges 105, when the travelling devices 52 are traveled, is resolved, whereby a required torque according to a travel operation can be reduced, and a device travel, which is performed by the small travelling devices 52, can be realized. Moreover at the same time, when the travelling devices 52 are traveled while the pressure component 32 is pressed to the wedges 105, although a flaw is caused at the surfaces of the wedges 105, it can be prevented that the flaw is formed. In addition, although the above-described back plate driving device 35 is composed of the cam 36, the motor 37, and the back plate return spring 38, if the back plate driving device 35 has a configuration in which the back plate 34 can be shifted in a pressure direction and a separation direction of the pressure portion 3, the back plate driving device 35 can be replaced, and, for example, a spring mechanism, a crank mechanism, a hydraulic mechanism and the like can be also used for the back plate driving device 35.

Figure 20:
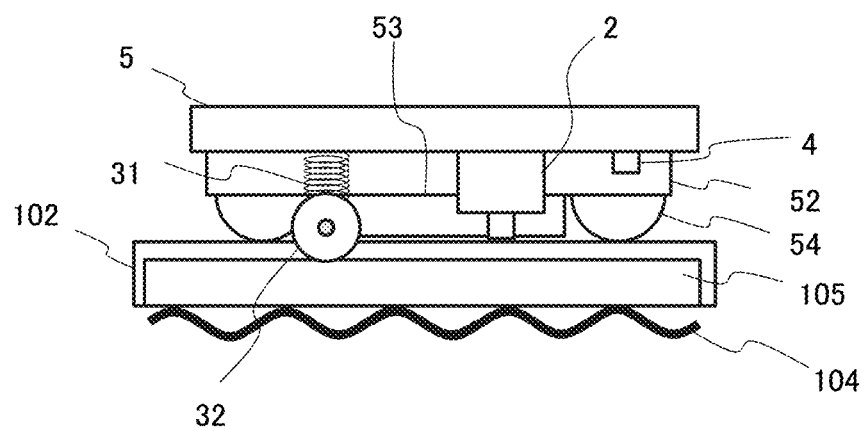
FIG. 20 is a configuration diagram which indicates a deformation example of the wedge looseness inspection device of the rotary electric machine of the present invention.

FIG. 20 is a configuration diagram which indicates the wedge looseness inspection device 1 in which a configuration of a pressure component 32 of a pressure portion 3 is improved. In FIG. 20, the pressure component 32 is formed as a wheel. As described above, a configuration of the wheel is adopted for the pressure component 32, whereby if the travelling devices 52 are traveled while the pressure component 32 is pressed to the wedges 105, a rolling friction is very lower in comparison with a sliding friction, so that a required torque according to a travelling operation can be reduced, and a device travelling by using a small travelling devices 52 can be realized. Moreover at the same time, it can be prevented that a flaw, which is caused when the travelling devices 52 are traveled while the pressure component 32 is pressed to the wedges 105, is formed. Moreover, there are valuations for depths to the surfaces of the wedges 105 with respect to the stator 102, and even if a step reference is caused when the travelling devices 52 are traveled between the wedges, the step reference can be hurdled with a low resistance when the wheel is used, so that a danger possibility, in which the travelling devices 52 are stopped at a middle position, can be greatly reduced.

In addition, the present invention is not limited to the above-described embodiments, and various modification examples are included. Moreover, in the present invention, in the scope of the present invention, it is possible that any configuration element in the embodiments is suitably modified or omitted.

What is claimed is:
1. A wedge looseness inspection device, of a rotary electric machine, comprising:
a strike portion which strikes wedges of the rotary electric machine;
a pressure portion which presses surfaces of the wedges;
a strike sound measuring portion which obtains a strike sound which is caused when the wedges are struck, wherein the pressure portion is configured to press the wedges when the wedges are struck by the strike portion for changing a vibration frequency of the wedges;

a base portion on which the strike portion, the pressure portion, and strike sound measuring portion are mounted; and a control device which controls the strike portion, the pressure portion, and strike sound measuring portion; wherein the wedges are struck by the strike portion, in a state where the wedges are pressed by the pressure portion, and an amount of looseness of the wedges is judged in accordance with the strike sound which is obtained by the strike sound measuring portion, wherein the pressure portion includes a pressure component, which presses the wedges, and a first elastic body which generates a force, by which the pressure component is pressed to the wedges, and is arranged between the base portion and the pressure component, and energizes the pressure component in such a way that the pressure component is pressed to the wedges, and wherein an attenuator, by which an attenuation force is generated in parallel with the elastic body, is provided between the pressure component and the base portion.

2. A wedge looseness inspection device of the rotary electric machine as recited in claim 1, wherein a second elastic body is arranged at the pressure component of the pressure portion, and the second elastic body at the pressure component is pressed to the surfaces of the wedges.

3. A wedge looseness inspection device of the rotary electric machine as recited in claim 1, wherein a strike force measuring devices, by which a strike force is measured, is attached to the strike portion.

4. A wedge looseness inspection device of the rotary electric machine as recited in claim 3, wherein the pressure portion is configured in such a way that the pressure portion is constricted.

5. A wedge looseness inspection device of the rotary electric machine as recited in claim 3, wherein the pressure portion includes a wheel, and the wedges are pressed by using the wheel.

6. A wedge looseness inspection device of the rotary electric machine as recited in claim 1, wherein the base portion includes travelling devices which can travel and a suction device which can suck and hold.

7. A wedge looseness inspection device, of a rotary electric machine, comprising:

a strike portion which strikes wedges of the rotary electric machine;

a pressure portion which presses surfaces of the wedges;

a strike sound measuring portion which obtains a strike sound which is caused when the wedges are struck, wherein the pressure portion is configured to press the wedges when the wedges are struck by the strike portion for changing a vibration frequency of the wedges;

a base portion on which the strike portion, the pressure portion, and strike sound measuring portion are mounted; and a control device which controls the strike portion, the pressure portion, and strike sound measuring portion; wherein the wedges are struck by the strike portion, in a state where the wedges are pressed by the pressure portion, and an amount of looseness of the wedges is judged in accordance with the strike sound which is obtained by the strike sound measuring portion, wherein the pressure portion includes a pressure component, which presses the wedges, and a first elastic body which generates a force, by which the pressure component is pressed to the wedges, and is arranged between the base portion and the pressure component, and energizes the pressure component in such a way that the pressure component is pressed to the wedges, and wherein the pressure component is configured in such a way that a vibration frequency of the wedges, which are vibrated by the strike portion, can be set at a low frequency.

8. A wedge looseness inspection device of the rotary electric machine as recited in claim 7, wherein a second elastic body is arranged at the pressure component of the pressure portion, and the second elastic body at the pressure component is pressed to the surfaces of the wedges.

9. A wedge looseness inspection device of the rotary electric machine as recited in claim 7, wherein a strike force measuring devices, by which a strike force is measured, is attached to the strike portion.

10. A wedge looseness inspection device of the rotary electric machine as recited in claim 9, wherein the pressure portion is configured in such a way that the pressure portion is constricted.

11. A wedge looseness inspection device of the rotary electric machine as recited in claim 9, wherein the pressure portion includes a wheel, and the wedges are pressed by using the wheel.

12. A wedge looseness inspection device of the rotary electric machine as recited in claim 7, wherein the base portion includes travelling devices which can travel and a suction device which can suck and hold.

* * * * *